United States Patent

Anders et al.

[11] 4,410,306
[45] Oct. 18, 1983

[54] APPARATUS FOR GRANULATING PLASTICS MATERIAL OR PLASTIC COMPOSITIONS

[75] Inventors: Dietmar Anders, Hanover; Jürgen Voigt, Wathlingen, both of Fed. Rep. of Germany

[73] Assignee: Hermann Berstorff Maschinenbau GmbH, Hanover, Fed. Rep. of Germany

[21] Appl. No.: 371,135

[22] Filed: Apr. 23, 1982

[30] Foreign Application Priority Data

Apr. 23, 1981 [DE] Fed. Rep. of Germany ....... 3116117

[51] Int. Cl.³ .............................................. B29C 25/00
[52] U.S. Cl. .................................... 425/71; 264/142; 425/311; 425/313
[58] Field of Search ............... 425/67, 71, 313–314, 425/311; 264/142

[56] References Cited

U.S. PATENT DOCUMENTS

| | | | |
|---|---|---|---|
| 1,500,934 | 7/1934 | Hooper | 425/67 |
| 2,027,419 | 1/1936 | Dreyfus | 264/181 |
| 3,287,764 | 11/1966 | Swickard et al. | 425/311 |
| 3,415,917 | 12/1968 | Watanabe et al. | 264/142 |
| 4,245,972 | 4/1981 | Anders | 425/67 |
| 4,249,879 | 2/1981 | Anders et al. | 425/313 |
| 4,300,877 | 11/1981 | Anderson | 425/67 |
| 4,385,884 | 5/1983 | Pecci | 425/313 |
| 4,385,884 | 5/1983 | Pecci et al. | 425/313 |

FOREIGN PATENT DOCUMENTS

| | | | |
|---|---|---|---|
| 891471 | 3/1944 | France | 425/67 |
| 56-2114 | 1/1981 | Japan | 264/143 |

*Primary Examiner*—Jay H. Woo
*Attorney, Agent, or Firm*—Schwartz, Jeffery, Schwaab, Mack, Blumenthal & Koch

[57] ABSTRACT

A granulation apparatus in which a conical chamber having a downwardly and outwardly inclined wall is provided for collecting cut granules. The wall is covered with a flowing, circulating film of water, such film being of uniform thickness and circulating quickly. An annular water channel is provided around the cylindrical or conical chamber for collecting the granules, the annular channel being fed through a tangential water inlet. A flat, annular horizontal acceleration chamber is disposed in the upper region of the annular channel and communicates with the channel through an annular aperture formed in the upper radially outward region of the annular channel. At its radially inner periphery the acceleration chamber communicates with the chamber through an annular aperture.

The disposition of the inlet, the channel and the acceleration chamber cause water flowing into the chamber to be subjected to centrifugal force whereby the film of water remains closely adjacent the wall and is of uniform thickness.

4 Claims, 3 Drawing Figures

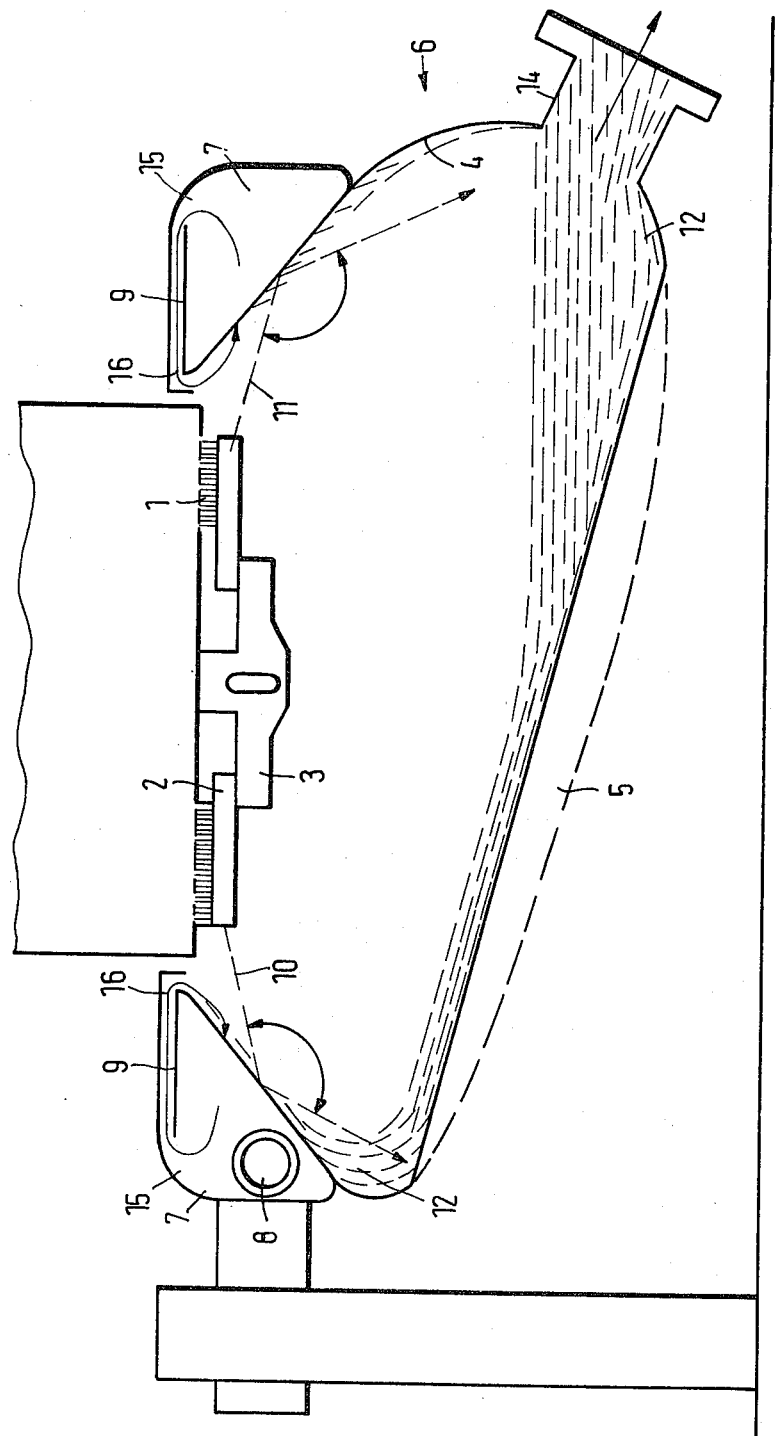

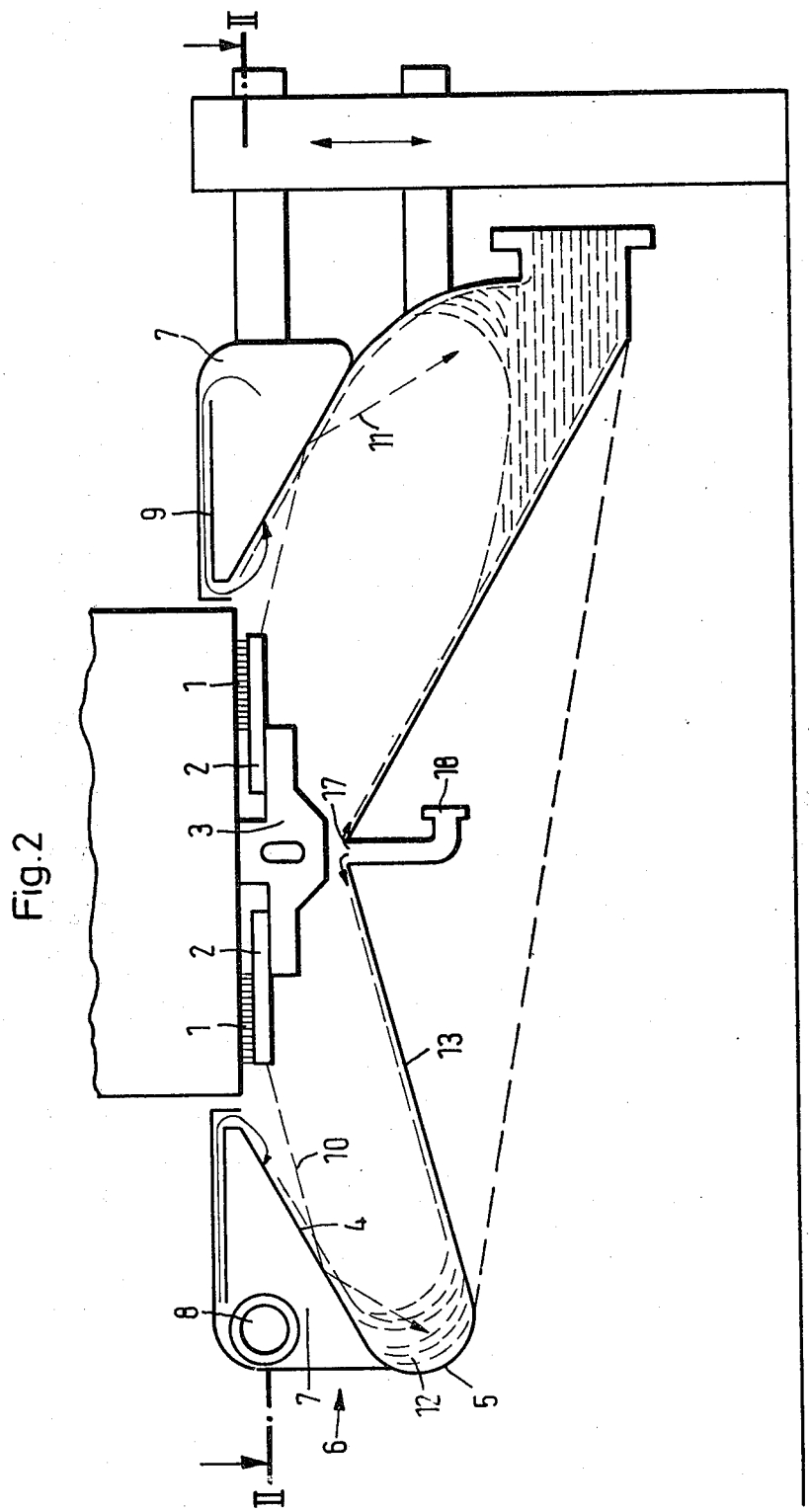

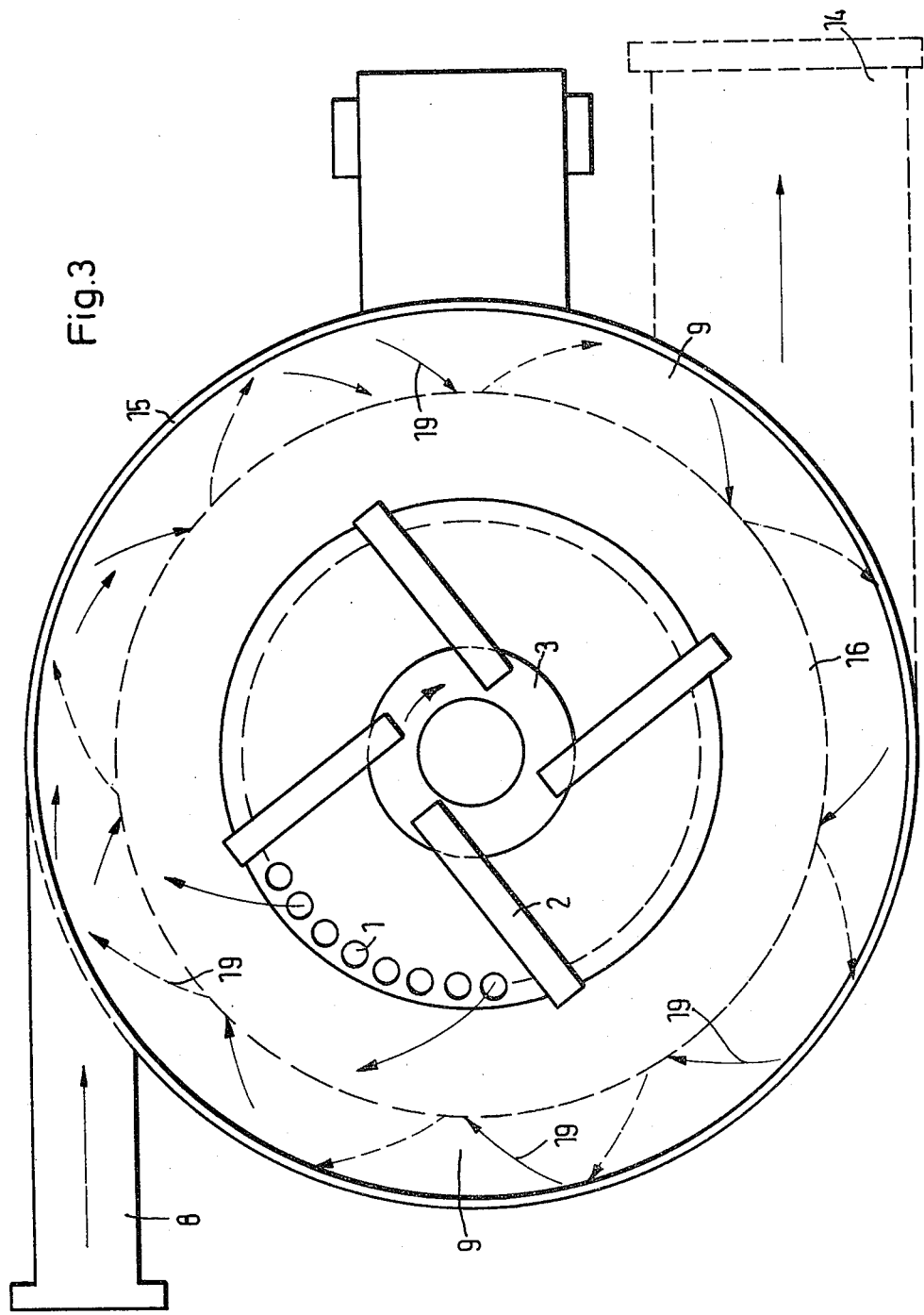

APPARATUS FOR GRANULATING PLASTICS MATERIAL OR PLASTIC COMPOSITIONS

FIELD OF THE INVENTION

The present invention relates to an apparatus for granulating molten or fused masses of plastics material or plastic compositions.

BACKGROUND OF THE INVENTION AND DISCUSSION OF PRIOR ART

A known apparatus for the purpose comprises a perforated plate and a multi-vaned or bladed rotary cutting tool which is mounted in front of, that is to say, downstream of the plate. The cutting tool comprises a cutter holder and cutter blades, the tool being surrounded by a particle granulation chamber which, in use, has a coolant liquid flowing therethrough.

In a further known granulation apparatus, the cut granulated materials or granules are centrifuged in a film of water, which film is produced by means of a pressureless overflow on a vertically disposed internal wall of the granulation chamber. The chamber may be in the form of a collector housing.

The cut granules are subjected to high, centrifugal forces by the cutters which rotate at a high speed. They therefore strike against the wall of the housing and are reflected to the centre of the housing. Due to the high speed impact of the granules with the film of water and the housing wall located therebehind, the granulates are liable to be deformed, which deformation may impair their friability.

If the chamber or housing for collecting the granules has an encircling internal wall which is inclined both downwardly and outwardly, the angle of reflection of the cut granulates is increased. This greatly reduces the risk of their deformation upon impact with the water or the wall. On the other hand, it is very difficult to produce a film of water of a uniform thickness and which can quickly transport away the cut granules on such an inclined surface.

OBJECTS OF THE INVENTION

The invention seeks to provide an apparatus in which a more effective transportation or discharge of the cut granulates is possible. More particularly, the present invention seeks to provide an apparatus in which a rapidly circulating film of water, of a uniform thickness and lying adjacent the encircling internal wall surface of the housing can be produced whilst maintaining the feature that the wall is outwardly and downwardly inclined so as to cause the reflected granules to have a large angle of reflection.

SUMMARY OF THE INVENTION

According to the present invention, there is provided an apparatus for granulating molten or fused masses of plastics material or plastic compositions comprising a perforated plate and a multi-bladed, rotary cutting tool located downstream, in the direction of travel of the material, of the plate, the cutting tool comprising a cutter holder and a plurality of cutter blades, the cutting tool being surrounded by a granulation chamber capable of having coolant liquid caused to flow therethrough and which, in use, collects the granulated material. The chamber is conical wherein an annular channel or reservoir for the coolant water is disposed around the conical chamber, the annular chamber being connected to a water inlet or feed conduit extending substantially tangentially thereto. A horizontal flat acceleration chamber is disposed in the upper region of the annular channel, the acceleration chamber extending inwardly from the annular channel in the manner of an annular ring, the annular chamber and the flat, annular acceleration chamber being in fluid flow communication with one another through an annular aperture formed in the outer peripheral region of the annular channel, the annular acceleration chamber having an annular aperture formed on its inner periphery which is in communication with the interior of the chamber for collecting the granulates of material.

By providing such an arrangement, a film of coolant water can be produced on the downwardly and outwardly inclined encircling internal wall surface of the housing, such film being of uniform thickness, remaining closely adjacent the wall and circulating at high speed.

The coolant water, which is fed tangentially into the annular channel, is subjected therein to a high centrifugal acceleration by the pressure of the following water. All of the water in this channel or reservoir circulates rapidly but the water at the outer periphery of the channel has the fastest rate of annular rotation.

This outer peripheral water passes through a circular aperture formed in the external periphery of the annular channel into a horizontal acceleration chamber, which chamber is of a flat or plate-like, annular form and therefore is somewhat akin to an annular nozzle.

In this annular, flat acceleration chamber, the coolant water is subject to further angular acceleration due to the diminishing radius of the acceleration chamber as the water flows generally from the outer to the inner periphery thereof. However, the absolute speed of the water remains constant.

The thus-accelerated coolant water has a high centrifugal force and passes then over or via the inner edge of the acceleration chamber onto the encircling internal wall of the housing. This wall is connected to the inner periphery of the acceleration chamber and slopes downwardly and outwardly therefrom.

Since the coolant water has a high centrifugal acceleration, and is no longer constrained by the acceleration chamber, it is free to flow outwardly again and therefore remains closely adjacent the downwardly and outwardly sloping internal wall of the housing even though it is still rapidly circulating. The film of water produced on the housing wall is of a uniform thickness.

By providing a conical or tapering internal wall which slopes downwardly and outwardly, a large angle of reflection is produced for the granules which strike the wall due to the centrifugal force imparted thereto by the cutters. Because the granules strike the wall at a greater angle of incidence than if the wall was vertical, they strike the wall a more glancing blow and are less likely to be damaged. Moreover, the sloping wall means that the granules are reflected into the circulating stream of water on the base of the housing, which stream transports the granules away. Reflections into the central region of the base of the housing, where it is possible that there is no flow of water, are therefore avoided or at least minimized.

Advantageously, a conical displacement body is formed in or on the base of the chamber for collecting the granulates of material, which body is substantially co-axial with the axis of the cutting tool, the body having a tip pointing upwardly towards the axis of the cutting tool, an outlet aperture having coolant water conduit connected thereto being formed in the region of the tip of the displacement body.

The displacement body may be of a conical, hemispherical, cylindrical or even irregular shape and by providing such a body the transportation and discharge of the granules is considerably facilitated. Moreover, the granules cannot accumulate in the centre of the collector housing and the transportation thereof is, in toto, generally more reliable and effective.

BRIEF DESCRIPTION OF THE DRAWINGS

Two embodiments of an apparatus in accordance with the present invention will be further described, by way of example, with reference to the accompanying drawings.

FIG. 1 is a diagrammatic, cross-sectional view through a first embodiment of an apparatus in accordance with the present invention;

FIG. 2 is a diagrammatic cross-sectional view through a second embodiment of an apparatus in accordance with the present invention, the housing of the apparatus including a conical displacement body;

FIG. 3 is a schematic plan view of a housing shown in FIG. 1 or 2 so as to illustrate more clearly the path followed by the coolant water when the apparatus is in use.

DESCRIPTION OF PREFERRED EMBODIMENTS

Prior to reaching the apparatus shown in FIG. 1, plastics material is made molten and extruded through nozzles in a perforated plate 1 by means of an extrusion unit (not shown) into a chamber or housing generally referenced 6.

Short granulated material pieces are cut from the extruded strands by means of rotating cutters 2, which cutters are mounted on a cutter holder 3. Due to the rotary action of the cutters 2, the granulated material is accelerated centrifugally so as to be, effectively, centrifuged onto a lower outwardly and downwardly tapering wall 4 of the housing 6. The granulated material strikes the wall 4 and is reflected thereby. The wall 4 is wetted with a film of coolant water. The granulated material rebounds from the wall at an angle dependent upon its angle of impact in such a manner as to enter a stream of coolant water which is circulating on the base 5 of the housing 6. This water, together with the granulated material which it collects, flows to the outlet of the housing and is discharged.

The coolant water is injected, under pressure, into the housing 6 through a feed aperture 8 which extends substantially tangentially to the housing for collecting the granulated material or to an annular channel 7 respectively.

In the annular channel 7 the coolant water is subjected to high centrifugal acceleration. The water which flows at the highest speed passes to the outer periphery of the channel 7 and thence through a circular aperture 15 into a flat acceleration chamber 9 which is annular and is of a plate-like construction. The coolant water passes inwardly through the annular acceleration chamber 9, which latter is, effectively, an annular nozzle. By so doing, the angular velocity of the water is increased whilst the absolute speed thereof remains constant.

After the coolant water has passed through the acceleration chamber 9, even though it is being forced inwardly by the pressure of the water still flowing through the aperture 8 into the channel, it has a substantially increased centrifugal force and, on leaving the constraints of the chamber 9 and entering the housing 6, it tends to fly outwardly.

The reduced diameter of the acceleration chamber 9 compared with that of the annular channel 7 therefore causes the angular velocity of the coolant water to be considerably increased. Accordingly, a very rapidly circulating stream of water is produced which is flowing in a circular direction and is very uniformly distributed on the wall 4 of the housing 6.

Since the water leaving the acceleration chamber 9 through the annular aperture 16 and entering the housing 6 has a very high centrifugal acceleration, it tends to remain adjacent the outwardly and downwardly inclined internal surface of the wall 4 of the housing 6 and therefore collects the granulated material.

Furthermore, the film of water on the wall 4 is travelling in the same direction of rotation as the cut granulated material which, it will be recalled, is subjected to centrifugal acceleration due to the action of the cutters 2.

The arrows 10 and 11 show the principal directions of movement of the cut granulated material.

Since individual granulates are caused to impact the wall 4, they are reflected into the circulating main stream of water 12 on the base of the housing 6 in dependence upon their angle of impact with the wall 4.

In FIG. 2, there is shown an arrangement in which a conical displacement body 13 is formed on, or is part of, the base of the housing: The apex of the conical body 13 is directed upwardly towards the central point of the rotating cutting tool. This eliminates the possibility of individual granules, which might otherwise be reflected off the side walls of the housing towards the central region thereof, remaining there, thereby causing the processing operation to be disrupted. Because of the location of the coolant water outlet 17 in this embodiment, which outlet has a conduit 18 connected thereto, the conical displacement body is also covered with a film of water and, in consequence, highly-adhesive materials may be granulated in such an arrangement.

Such a conical displacement body 17 has advantages over a conventional housing construction and such advantages will now be discussed.

When a stream of water is circulated in a housing a centrifugal force is set up and the central region of the housing is not covered with a film of water. Consequently, any granulated material which has been reflected into this central region is not transported away. This deficiency needs to be overcome in as simple and as highly effective a manner as possible. If the base of the housing is flat it would be possible for the amount of water running into the housing to be increased so as to cover also the central region. However, tests have shown that even quadrupling the amount of water normally sufficient to optimally wet the housing walls and to transport the granules away does not achieve a satisfactory solution to this problem. Any further increase above this in the amount of water used is prohibitive for energy reasons.

Despite quadrupling the amount of water used, granulated material may still remain in the central region of the housing and, consequently considerable operational disruptions occur after some time.

The provision of the collector housing 6 shown in FIG. 2 appears, from tests, to overcome the problem. This is particularly advantageous if the materials being treated have a strong tendency to adhere either to the walls of the housing or to one another.

The centrifugal acceleration of the stream of water prior to passing into the housing 6 is shown in FIG. 3.

The coolant water entering the circular aperture 15 from the annular channel 7 has a high centrifugal force and passes into the acceleration chamber 9. In this chamber, the water is angularly accelerated, such acceleration substantially increasing the centrifugal force. The coolant water then passes to the inner periphery of the flat, annular acceleration chamber 9, that is to say, the peripheral portion of the chamber leading into the interior of the housing, whereupon it passes through the annular aperture 16 and, due to its direction of acceleration, is free to rotate again so as to remain adjacent the downwardly and outwardly inclined internal wall 4 of the housing 6.

The flow of the water is shown by the arrows 19 in FIG. 3, the arrows shown in solid lines indicating the direction of travel of the water whilst in the channel 9 and the broken lines indicating the direction of travel after the water has left the aperture 16 and entered the housing 6.

The construction in accordance with the present invention permits the use of a housing for collecting the granulated material which has a downwardly and outwardly conically-tapering impact surface 4 which, as aforementioned, is highly desirable if the cut granulated material is not to be damaged and also permits such surface 4 to be covered with a circulating film of water which is of a uniform thickness and has a high capacity for transporting away the cut granulated material.

LIST OF REFERENCE NUMERALS

1 = perforated plate
2 = cutter
3 = cutter holder
4 = lower wall of the annular channel, conical impact surface
5 = base of chamber 6
6 = granulation chamber or housing for collecting the granulated material
7 = annular channel
8 = coolant water feed aperture
9 = acceleration chamber
10 = direction of travel of cut granulated material
11 = direction of travel of cut granulated material
12 = principal stream of water
13 = conical displacement body
14 = outlet aperture for water
15 = annular aperture connecting channel 7 and chamber 9
16 = annular aperture connecting chamber 9 and chamber 6
17 = coolant water outlet
18 = water outlet conduit
19 = water flow direction arrows.

I claim:

1. Apparatus for granulating molten or fused masses of plastics material comprising:
   (a) feed means for said material,
   (b) means for granulating said material, including a rotatable cutting means positioned downstream of said feed means,
   (c) a granulation chamber surrounding and extending below said cutting means and having at least in its upper region a downwardly and outwardly inclined annular wall surface against which said granulated material impacts and over which water flows to carry away said granulated material, said chamber having an open end adjacent said cutting means and on opposite end through which granulated materials are discharged from said chamber,
   (d) an annular channel adjacent said open end of said chamber,
   (e) water feed means communicating with said channel for delivering water under pressure thereto, the water undergoing high centrifugal acceleration in said channel,
   (f) means defining an annular acceleration chamber one end of which communicates with said channel and the other end of which comprises an opening communicating with the interior of said granulation chamber, whereby water is centrifugally accelerated in said acceleration chamber as a result of which water flows through said opening and down the outwardly and downwardly inclined wall surface of said granulation chamber to carry away said granulated materials.

2. The apparatus of claim 1 wherein said water feed means directs water tangentially into said annular channel thereby subjecting such water to high centrifugal acceleration, and wherein said annular acceleration chamber is defined by a plate spaced downwardly from the top wall of said channel whereby said acceleration chamber is defined between said plate and said top wall, said plate terminating at its radially outer end from the side wall of said channel to form an aperture, whereby water under centrifugal acceleration flow to said acceleration.

3. The apparatus of claim 2 wherein said opening of said annular acceleration chamber communicating with the interior of said granulation chamber comprises an annular aperture defined by the inner end of said plate and a downwardly turned flange of said top wall of said channel.

4. The apparatus of claim 1 wherein said granulation chamber is defined by a housing body generally conically shaped centrally of the apparatus to form an upwardly directed apex generally coaxial with the axis of rotation of said rotatable cutting means, said apex being open, and water outlet means communicating with said open apex for delivering water to the inclined conical walls of said body.

* * * * *